US 8,498,360 B1

United States Patent
Shen et al.

(10) Patent No.: US 8,498,360 B1
(45) Date of Patent: *Jul. 30, 2013

(54) SYSTEMS AND METHODS FOR WIRELESS COMMUNICATION SYSTEM CHANNEL ALLOCATION USING INTENTIONAL DELAY DISTORTION

(75) Inventors: Manyuan Shen, Bellevue, WA (US); Guanbin Xing, Issaquah, WA (US)

(73) Assignee: Adaptix, Inc., Plano, TX (US)

( * ) Notice: Subject to any disclaimer, the term of this patent is extended or adjusted under 35 U.S.C. 154(b) by 243 days.

This patent is subject to a terminal disclaimer.

(21) Appl. No.: 12/861,457

(22) Filed: Aug. 23, 2010

Related U.S. Application Data

(63) Continuation of application No. 11/501,211, filed on Aug. 8, 2006, now Pat. No. 7,804,910.

(51) Int. Cl.
*H04B 7/02* (2006.01)
*H04L 1/02* (2006.01)

(52) U.S. Cl.
USPC ........... 375/267; 375/260; 375/299; 375/347; 455/101; 455/503; 455/506

(58) Field of Classification Search
USPC .................. 375/267, 260, 299, 347; 455/101, 455/503, 506
See application file for complete search history.

(56) References Cited

U.S. PATENT DOCUMENTS

| | | |
|---|---|---|
| 7,181,246 B2 | 2/2007 | Lo |
| 7,804,910 B2 * | 9/2010 | Shen et al. ............ 375/267 |
| 2002/0154705 A1 | 10/2002 | Walton et al. |
| 2003/0125040 A1 * | 7/2003 | Walton et al. ............ 455/454 |
| 2005/0254592 A1 * | 11/2005 | Naguib et al. ............ 375/267 |
| 2005/0281240 A1 | 12/2005 | Oh et al. |
| 2007/0008946 A1 | 1/2007 | Kim |

OTHER PUBLICATIONS

International Search Report and Written Opinion issued for PCT Application PCT/US2007/074781; Dated: Mar. 20, 2008; 11 Pages.

* cited by examiner

*Primary Examiner* — Phuong Phu
(74) *Attorney, Agent, or Firm* — Martin & Ferraro, LLP

(57) ABSTRACT

Advantage is taken of adaptive allocation techniques by intentionally creating multi-user diversity in an otherwise flat fading environment in order to improve system capacity. In one embodiment, multi-path distortion can be resolved to determine subscriber station (SS) diversity gain. Overall network capacity can be increased by allocating channel assignments to SSs within the network based on determined SS diversity gains. In one embodiment, intentional multi-path distortion is produced by transmitting a signal and a time-delayed version of the signal from a base station (BS).

20 Claims, 3 Drawing Sheets

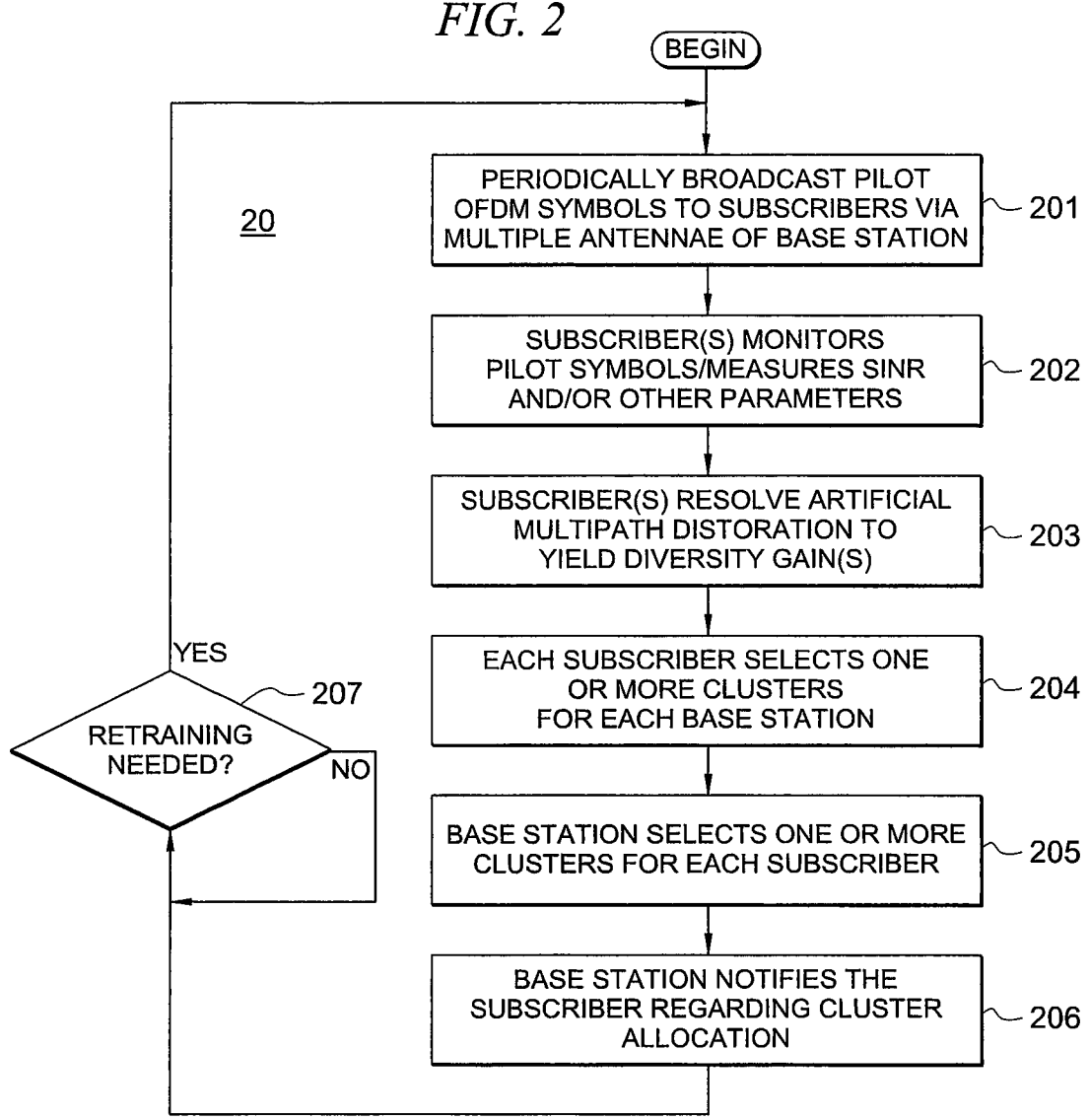

SYSTEMS AND METHODS FOR WIRELESS COMMUNICATION SYSTEM CHANNEL ALLOCATION USING INTENTIONAL DELAY DISTORTION

CROSS-REFERENCE TO RELATED APPLICATIONS

This application is a Continuation of application Ser. No. 11/501,211 filed on Aug. 8, 2006.

TECHNICAL FIELD

This invention relates to wireless network channel allocations and more particularly to systems and methods using intentional multi-path distortion to facilitate such allocations.

BACKGROUND OF THE INVENTION

In wireless communication systems having selectively fading channels, different users experience peaks in their channel quality at different times or at different frequencies. This effect is called multi-user diversity. Multi-user diversity can be exploited in a selectively fading environment by designating users to transmit during times or at frequencies providing favorable channel conditions. For example, in a multi-carrier communication systems, significant performance improvements can be achieved by adaptively allocating to each subscriber multiple subcarriers based on, for example, load traffic information on each subcarrier, signal quality at the subscriber station, whether frequency bands are overused, and level of requests queued at the base station.

Adaptive allocation techniques are generally ineffective in flat fading environments. For example, adaptive allocation may not be practicable in a multi-carrier system with substantially similar subcarrier gains at the subscriber station.

BRIEF SUMMARY OF THE INVENTION

Advantage is taken of adaptive allocation techniques by intentionally creating multi-user diversity in an otherwise flat fading environment in order to improve system capacity. In one embodiment, multi-path distortion can be resolved to determine subscriber station (SS) diversity gain. Overall network Capacity can be increased by allocating channel assignments to SSs within the network based on determined SS diversity gains. In one embodiment, intentional multi-path distortion is produced by transmitting a signal and a time-delayed version of the signal from a base station (BS).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2 shows one embodiment of a process for allocation clusters to SSs;

DETAILED DESCRIPTION OF THE INVENTION

Figure 1:
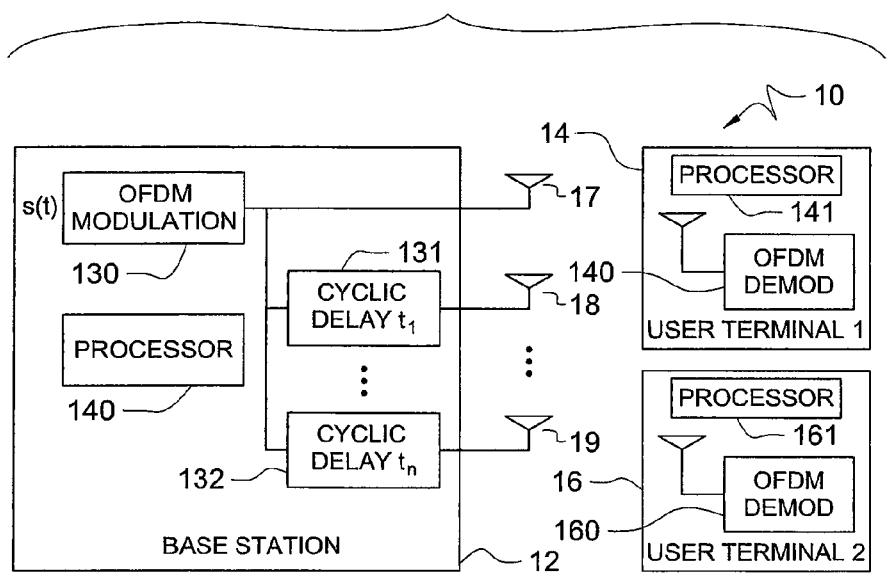
FIG. 1 shows a network system adapted according to an embodiment of the present invention.

FIG. 1 shows one embodiment 10 in which base station (BS) 12 is in wireless communication with subscriber station (SS) 14 and SS 16. BS 12 broadcasts signals 17, 18, 19, which can be broadcast from separate antennas or from a common antenna. In one embodiment, a method for subcarrier selection for a system employing orthogonal frequency division multiple access (OFDMA) comprises partitioning subcarriers into groups of at least one cluster of subcarriers, receiving an indication of a selection by the subscriber of one or more clusters in the groups, and allocating at least one cluster in the one or more groups of clusters selected by the subcarrier for use in communication with the subscriber. As described in further detail herein, subcarrier selection may utilize diversity gain information determined by resolving intentional (artificial) multi-path distortion caused by transmission of a signal (for example signal 17 from OFDM modulator 130) and a time-delayed version of that signal (for example signal 18 from cyclic delay 131 and signal 19 from cyclic delay 132).

The techniques disclosed herein are described using OFDMA (clusters) as an example, but the concepts taught are not limited to OFDMA-based systems. Rather, the techniques may apply to multi-carrier systems in general. As can be seen in the following description, one advantage of these techniques is that minimal changes are required to the BS and SS relative to a standard OFDM system.

In one embodiment, subcarrier allocation is performed in each cell separately. Within each cell, the allocation for individual SSs is also made progressively as each new subscriber is added to the system as opposed to joint allocation for subscribers within each cell in which allocation decisions are made taking into account all subscribers in a cell for each allocation.

For downlink channels, each SS measures the channel and interference information for multiple subcarriers and then selects multiple subcarriers with good performance (e.g., a high signal-to-interference plus noise ratio (SINR)) and feeds back the information on these candidate subcarriers to the base station. The feedback may comprise channel and interference information on all subcarriers or just a portion of the subcarriers. In the case of providing information on only a portion of the subcarriers, an SS may provide a list of ordered subcarriers starting with those subcarriers which the subscriber desires to use, usually because performance is good or better than that of other subcarriers. The subchannels which comprise this list are decoded by demodulators 140 and 160 and the ordered list is provided by processors 141 and 161, respectively.

Upon receiving the information from the SS, BS 12 further selects, for example, under control of processor 140, the subcarriers among the candidates, utilizing additional information available at BS 12, e.g., the traffic load information on each subcarrier, amount of traffic requests queued at BS 12 for each frequency band, whether frequency bands are overused, and/or how long a SS has been waiting to send information. BS 12 can use this information in subcarrier allocation to reduce inter-cell interference.

FIG. 2 shows flow diagram 20 which is one embodiment of a process for allocation clusters to SSs. The process is performed by processing logic that may comprise hardware (e.g., dedicated logic, circuitry, etc.), software (such as that which runs on, for example, a general purpose computer system or a dedicated machine), or a combination of both.

Referring to FIG. 2, processor 201 periodically broadcasts pilot OFDM symbols (for example from BS 12) to SS 14 and SS 16 within its cell (or sector). The pilot symbols, often referred to as a sounding sequence or signal, are known to both BS 12 and SSs 14, 16. The pilot symbols can serve multiple purposes: time and frequency synchronization, channel estimation and signal-to-interference/noise (SINR) ratio measurement for cluster allocation. BS 12 broadcasts the OFDM symbol as signal 17 and time-delayed versions as signals 18, 19.

Process 202 monitors the reception of the pilot symbols from each SS and measures the SINR and/or other parameters, including inter-cell interference and intra-cell traffic, of each cluster. Each SS encounters multi-path distortion created by the time-delayed transmission of the pilot symbols.

Process 203 estimates the frequency domain channel response, for example, by using a minimum mean square error (MMSE) channel estimator, to yield diversity gain information.

Based on this information, each SS, via process 204, selects one or more clusters with good performance (e.g., high SINR and low traffic loading) relative to each other and feeds back the information on these candidate clusters to BS 12 through predefined uplink access channels. For example, SINR values higher than 10 dB may indicate good performance. Likewise, a cluster utilization factor less than 50% may be indicative of good performance. Each subscriber selects the clusters with relatively better performance than others. The selection results in each subscriber selecting clusters they would prefer to use based on the measured parameters.

Upon receiving the feedback from a SS, process 205 at BS 12 selects one or more clusters for the subscriber among the candidates. BS 12 may utilize additional information available at the base station, e.g., the traffic load information on each subcarrier, amount of traffic requests queued at the base station for each frequency band, whether frequency bands are overused, and how long a subscriber has been waiting to send information. The subcarrier loading information of neighboring cells can also be exchanged between base stations. The base stations can use this information in subcarrier allocation to reduce inter-cell interference.

Process 206 causes BS 12 to notify each SS about the cluster allocation through a downlink common control channel or through a dedicated downlink traffic channel if the connection to the subscriber has already been established. In one embodiment, BS 12 also informs the SS about the appropriate modulation/coding rates. Once the basic communication link is established, each SS can continue to send feedback to BS 12 using a dedicated traffic channel (e.g., one or more predefined uplink access channels).

Process 207 determines if retraining is necessary and, as needed, causes the process 20 to repeat. The retraining may be performed periodically. This retraining compensates for SS movement and any changes in interference. In one embodiment, each SS reports to BS 12 its updated selection of clusters. Then BS 12 further performs the reselection and informs the SS about the new cluster allocation. Retraining can be initiated by BS 12, and in which case, BS 12 requests a specific subscriber to report its updated cluster selection. Retraining can also be initiated by the SS when it observes channel deterioration.

Figure 3:
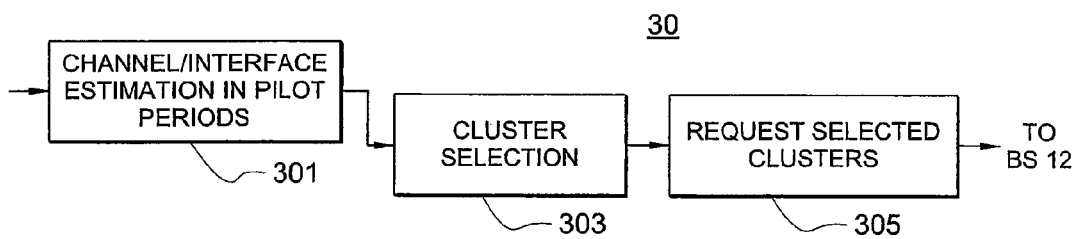
FIG. 3 shows one embodiment of a subscriber processing system.

FIG. 3 illustrates one embodiment 30 of subscriber processing. The processing is performed by processing logic that may comprise hardware (e.g., dedicated logic, circuitry, etc.), software (such as that which runs on, for example, a general purpose computer system or dedicated machine such as processor 141 of FIG. 1), or a combination of both.

Referring to FIG. 3, channel processor 301 performs channel estimation in pilot periods in response to pilot symbols. Channel processor 301 resolves multi-path distortion of the pilot symbols created, at least in part, by transmission of time-delayed versions of the pilot symbols by the BS antennae. Channel processor 301 uses the multi-path distortion information to determine diversity gain. A standard OFDM channel estimator may be used, such as a common 2D MMSE. To exploit the diversity gain, the SS only needs to calculate the signal to noise ratio (SNR) of each subcarrier, and report the subcarriers with the highest SNR to the BS.

Cluster selector 303 is coupled to channel processor 301 to perform cluster selection, generally based on SNR. The output of cluster selector 303 is input to cluster request processor 305, which requests clusters and modulation/coding rates. The number of clusters selected may vary from 1 to the total number available. Indications of these selections are sent to BS 12 (FIG. 1). The information is used for cluster selection to avoid clusters with heavy intra-cell traffic loading and/or strong interference from other cells. That is, a new subscriber may not be allocated use of a particular cluster if heavy intra-cell traffic loading already exists with respect to that cluster. Also, clusters may not be allocated if the interference is so strong that the SINR only allows for low-rate transmission or no reliable transmission at all.

Delay diversity may be used to increase frequency diversity of an orthogonal frequency division multiplexing access (OFDMA) network. In such a network, the increased frequency diversity can be used with a Forward Error Correction (FEC) code to lower Bit Error Rate (BER) or Frame Error Rate (FER) or both.

Figure 4:
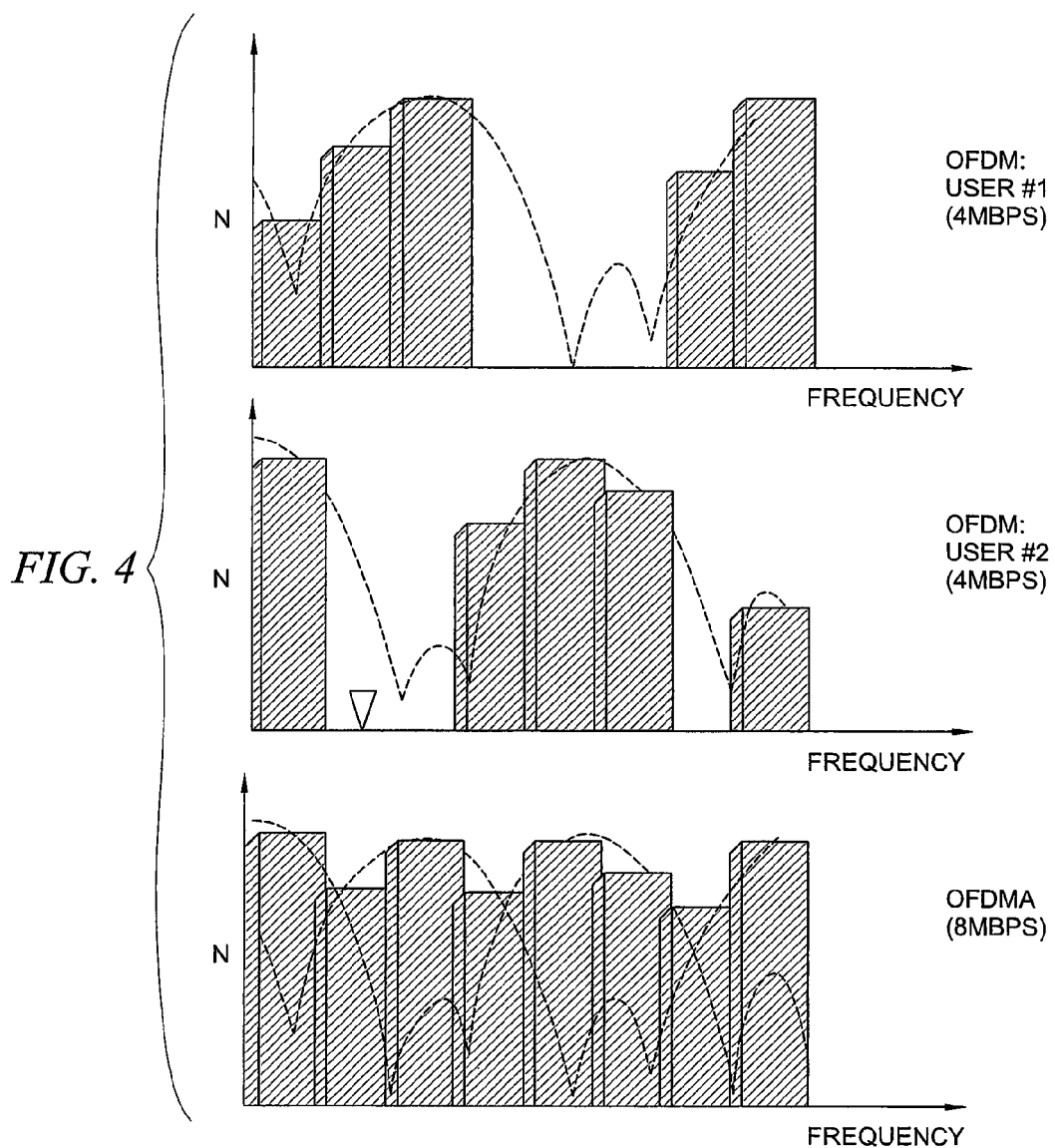
FIG. 4 illustrates selective frequency assignments of an OFDMA network.

FIG. 4 illustrates selective frequency assignments of a OFDMA network yielding improved network throughput. By exploiting the selective fading characteristics of User #1 and #2 channels, an OFDMA network can allocate channels to SSs with the highest SNR. In one embodiment, a maximum time delay for signals 18 or 19 can be determined so that inter-symbol interference in an OFDMA network can be minimized by selecting time delays which are less than the determined maximum time delay.

The intentionally introduced delay should not exceed the designed cyclic prefix (CP) of the system. To maintain protection against multi-path delay, a fraction of the CP duration, perhaps ⅛ of the CP might be choose as the intentional delay. For example, in typical WiMAX systems, the CP is designed to tolerate multi-path delay of up to 8 microseconds (μs). Thus, 1 could provide sufficient frequency selectivity while retaining most of the protection against multi-path delay. The effective CP power would be ⅞ of the power without a delay. Additionally, the introduced delay may be slowly changed over time, and can be different among different cells or sectors. By changing delay pattern, the resulted frequency selectivity is also changing, so that traffic allocation may be more equally spread among multiple subcarriers. This results in each SS being served more fairly. Also, by using different delay patterns among various BSs, the inter-cell interference can be reduced since. This is because interfering signals from neighboring cells may experience fading and the intended signal, from the serving BS, may have a peak response, due to delay pattern differences.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for enhancing capacity in an orthogonal frequency division multiple access (OFDMA) wireless system, said method comprising:
   intentionally creating a multi-path distortion in signals broadcast from a base station in an otherwise flat fading environment;
   allocating a first plurality of subcarriers to a first subscriber station and a second plurality of subcarriers to a second subscriber station based upon a determination of diversity gains of said first and second subscriber stations, said determination being based, at least in part, on said intentionally created multi-path distortion;
   receiving a notification that a retraining is needed for said first subscriber station based on a measured channel deterioration for said first subscriber station; and
   after said receiving said notification:
      broadcasting new signals with a new intentionally created multi-path distortion;
      redetermining said diversity gains of at least said first subscriber station; and
      allocating a new first plurality of subcarriers to said first subscriber station based on said redetermined diversity gains, at least one subcarrier of said new first plurality of subcarriers being different from at least one subcarrier of said first plurality of subcarriers.

2. The method of claim 1, wherein said intentionally created multi-path distortion is created by broadcasting a signal and at least one time-delayed version of said broadcast signal.

3. The method of claim 2, wherein said diversity gains are determined by resolving said intentionally created multi-path distortion created by said at least one time-delayed version of said broadcast signal.

4. The method of claim 2, wherein said base station utilizes orthogonal frequency division multiplexing (OFDM).

5. The method of claim 4, wherein said broadcast signal comprises pilot OFDM symbols.

6. The method of claim 2, wherein said at least one time-delayed version of said broadcast signal is broadcast according to a pattern.

7. The method of claim 6, wherein said pattern changes over time.

8. The method of claim 1, further comprising:
   notifying said first subscriber station and said second subscriber station of results of said allocating, wherein said notifying uses at least one downlink common control channel.

9. A method for enhancing multi-user diversity in an orthogonal frequency division multiple access (OFDMA) wireless system, said method comprising:
   selecting a first plurality of subcarriers for a first subscriber station upon a determination of a diversity gain of said first subscriber station, said first subscriber station diversity gain determination based on an intentional multi-path distortion created by transmission of a first pilot signal and a time-delayed version of said first pilot signal from a base station;
   selecting a second plurality of subcarriers for a second subscriber station upon a determination of a diversity gain of said second subscriber station, said second subscriber station diversity gain determination based on said created intentional multi-path distortion;
   allocating a communication channel to said first subscriber station based, at least in part, on said selection of said first plurality of subcarriers;
   allocating a different communication channel to said second subscriber station based, at least in part, on said selection of said second plurality of subcarriers;
   receiving a notification that a retraining is needed for said first subscriber station based on a measured channel deterioration; and
   after said receiving said notification, selecting a new first plurality of subcarriers for said first subscriber station based upon a newly determined diversity gain of said first subscriber station, said newly determined diversity gain based on a new intentional multi-path distortion created by transmission of a new pilot signal and at least one time-delayed version of said new pilot signal from said base station, and at least one subcarrier of said new first plurality of subcarriers being different from at least one subcarrier of said first plurality of subcarriers.

10. The method of claim 9, further comprising:
    determining if said retraining is necessary for said first subscriber station; and
    if said retraining is necessary, re-allocating another communication channel to said first subscriber station to compensate for movement of said first subscriber station.

11. The method of claim 9, wherein said allocating said different communication channel is based, at least in part, on said allocating said communication channel.

12. The method of claim 11, wherein said allocating said different communication channel is performed when said second subscriber station is added to said OFDMA wireless system.

13. A subscriber station in a wireless system, said subscriber station comprising:
    an orthogonal frequency division modulation (OFDM) demodulator configured to:
       receive a signal and an intentionally delayed version of said signal, where said intentionally delayed version of said signal intentionally creates multi-user diversity in said wireless system;
send a selection of at least one channel to a base station; and
receive an allocation of a channel based, at least in part, on said sent selection of said at least one channel; and
a processor configured to:
resolve multi-path distortion created by said received intentionally delayed version of said signal to determine a diversity gain of said subscriber station; and
select said at least one channel based on said determined diversity gain of said subscriber station.

14. The subscriber station of claim 13, wherein said processor is further configured to:
update said selection of said at least one channel, performed periodically to compensate for movement of said subscriber station within said wireless system.

15. The subscriber station of claim 13, wherein said processor is further configured to:
update said selection of said at least one channel, performed periodically to compensate for changes in said determined diversity gain of said subscriber station.

16. A method for enhancing multi-user diversity in an orthogonal frequency division multiple access (OFDMA) wireless system, said method comprising:
selecting a first plurality of subchannels for a first subscriber station based upon a first determination of diversity gain based on a intentional multi-path distortion of a signal broadcast from a base station in an otherwise flat-fading environment;
selecting a second plurality of subchannels for a second subscriber station based upon a second determination of diversity gain based on said intentional multi-path distortion of said broadcast signal;
allocating one or more subcarriers to a plurality of subscriber stations in an OFDMA network based on said first and second determined diversity gains, wherein said first and second determined diversity gains are obtained by resolving said intentional multi-path distortion;
receiving a notification that retraining is needed for said first subscriber station based on a measured channel deterioration; and
after said receiving said notification, selecting a new first plurality of subchannels for said first subscriber station based upon a new determination of diversity gain based on a new intentional multi-path distortion of a new signal broadcast from said base station, at least one subchannel of said new first plurality of subchannels being different from at least one subchannel of said first plurality of subchannels.

17. The method of claim 16, wherein said allocating further comprises a dynamic resource allocation scheme, said dynamic resource allocation scheme comprising assigning a particular subcarrier to said plurality of subscriber stations based on said obtained first and second determined diversity gains.

18. The method of claim 16, further comprising:
from time to time modifying a channel allocation between said base station and one or more subscriber stations of said plurality of subscriber stations to optimize network capacity.

19. The method of claim 16, wherein said intentional multi-path distortion is created by broadcasting a pilot signal and at least one time-delayed version of said pilot signal.

20. A subscriber station within a wireless system, said subscriber station comprising:
an orthogonal frequency division modulation (OFDM) demodulator configured to:
receive a signal and an intentionally delayed version of said signal, where said intentionally delayed version of said signal intentionally creates multi-user diversity in said wireless system; and
receive allocation of a channel, wherein said channel allocation is based, at least in part, on a selection of at least one channel; and
a processor configured to:
resolve multi-path distortion created by said received intentionally delayed version of said signal to determine a diversity gain of said subscriber station;
select said at least one channel based on said determined diversity gain of said subscriber station; and
update said selection of said at least one channel, said updating being performed periodically to compensate for changes in said determined diversity gain of said subscriber station.

* * * * *